United States Patent [19]

Shimamura et al.

[11] Patent Number: 4,835,375

[45] Date of Patent: May 30, 1989

[54] DEVICE FOR READING/WRITING IC CARD AS EXTERNAL MEMORY

[75] Inventors: Norio Shimamura; Taiji Sudo, both of Tokyo, Japan

[73] Assignee: Tokyo Tatsuno Co., Ltd., Tokyo, Japan

[21] Appl. No.: 55,283

[22] Filed: May 29, 1987

[30] Foreign Application Priority Data

May 29, 1986 [JP] Japan .................. 61-125268

[51] Int. Cl.$^4$ .......................... G06K 13/04
[52] U.S. Cl. .................... 235/479; 235/482
[58] Field of Search ........... 235/479, 482, 483, 485, 235/486, 492, 436, 475; 360/99

[56] References Cited

U.S. PATENT DOCUMENTS

| | | | |
|---|---|---|---|
| 3,185,949 | 5/1965 | Jordan | 235/479 X |
| 3,760,164 | 9/1973 | Kral | 235/483 X |
| 4,114,028 | 9/1978 | Baio et al. | 235/482 X |
| 4,236,667 | 12/1980 | Crowley et al. | 235/479 X |
| 4,575,703 | 3/1986 | Shishido | 235/479 |
| 4,724,310 | 2/1988 | Shimamura et al. | 235/483 |

FOREIGN PATENT DOCUMENTS

| | | |
|---|---|---|
| 0167356 | 1/1986 | European Pat. Off. . |
| 3442397 | 5/1986 | Fed. Rep. of Germany ...... 235/441 |
| 2124420 | 2/1984 | United Kingdom . |

*Primary Examiner*—Philip H. Leung
*Attorney, Agent, or Firm*—Sughrue, Mion, Zinn, Macpeak and Seas

[57] ABSTRACT

Device for reading/writing IC card as external memory, the device being electrically coupled with a data processing apparatus, and has a slit provided at one end of the device casing through which the IC card is loaded and unloaded in a horizontal direction. The device has a carriage member which operates upon angularly movable conductive terminals provided in the casing when pushed forward by the inserted card so as to cause angular movement of the conductive terminals and frictional contact of terminals of the card with the first terminals and holds the inserted card in a reading/writing position during a reading/writing operation of the data processing apparatus.

8 Claims, 6 Drawing Sheets

DEVICE FOR READING/WRITING IC CARD AS EXTERNAL MEMORY

BACKGROUND OF THE INVENTION

The invention relates generally to a device to be electrically coupled with a data processing apparatus for reading stored data out of and writing new data in an IC card as external memory, and more particularly to an improvement of such device of the type where the IC card is loaded in a horizontal direction from a slit provided at one end of the device casing so as to make electrical engagement with conductive terminals mounted at the opposite end thereof for reading/writing.

The so-called IC card, which has a plurality of conductive terminals exposed to be flush with the surface of one side of the card generally made of plastics and electrically connected with a memory circuit and a central processing unit respectively embedded therein, has far more storage capacity than the magnetic card so that it is going to be widely used as a credit card, cash card, prepaid card, identification card and so on instead of the conventional magnetic card.

In order to read/write data in and from such an IC card having conductive terminals of various numbers and arrangements as external memory for various data processing apparatuses or computers, a particular device is necessary as referred to above as in interface.

U.S. Pat. No. 4,575,703 discloses a device of the art referred to above, which has a slit for card insertion formed in one end wall of the casing, conductive terminals mounted in the casing in the vicinity of the other end wall and a slider held by spring means so that when the inserted card abuts on a portion of said slider the card may push it against the force of said spring means to be brought in the operating position where said slider is held by a latch and conductive terminals there engage with those of the card, and when the latch is manually disengaged the card is ejected by the force of said spring means.

This is, however, disadvantageous in that the conductive terminals in the form of resilient metal contacts fixed to the housing wall may be worn and wear the contacts of the card and accidental or erroneous release of the latch and removal of the card during data processing may cause important results on either of the card and the data processing apparatus to be lost.

In order to avoid and overcome said defects, we, the inventors have proposed in U.S. patent application Ser. No. 747,148 (now issued U.S. Pat. No. 4,724,310) an improvement which comprises essentially the carriage or the slider which may slide up to be in the reading/writing position when the card thereon is electrically engaged with a block having contact pins resiliently planted therein and the card may be automatically held at the tail end by locking hooks during data processing which may be released by solenoid means to be actuated in reply to the signal from the data processing apparatus.

This is, however, unsatisfactory in that since the card is firmly held by the carriage at one end and by said lock hooks at the other end, an undesiredly strong mechanical force is affected on the card, and that the sloped floor for the card to slide up inevitably causes the thickness or height of the device to be larger.

BRIEF EXPLANATION OF THE INVENTION

It is an object of the invention thus to provide a device of the art referred to above which may overcome the defects referred to above.

More specifically, it is an object of the invention to provide a device for reading/writing data from and in the IC card as external memory, which is compact, above all thin and can assure good electrical engagement between the terminals of the card and the device and completely prevent accidental, erroneous or deliberate removal of the card and returning of the carriage during the data processing.

DESCRIPTION OF THE PREFERRED EMBODIMENT

The embodiment of the invention illustrated in FIGS. 1-11 will be explained as the device for coping with an IC card K shown in FIG. 12.

Figure 1:
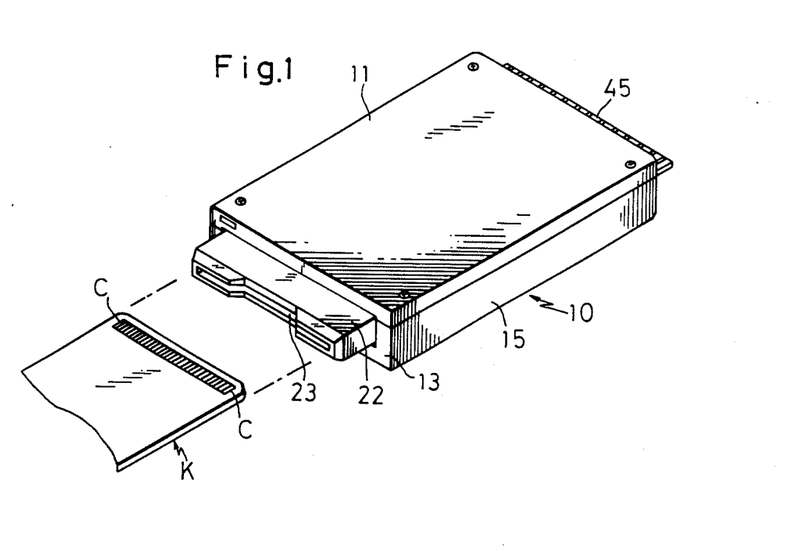
FIG. 1 is a perspective view of the device according to the invention into which an IC card is to be inserted from an inlet slit.
Figure 2:
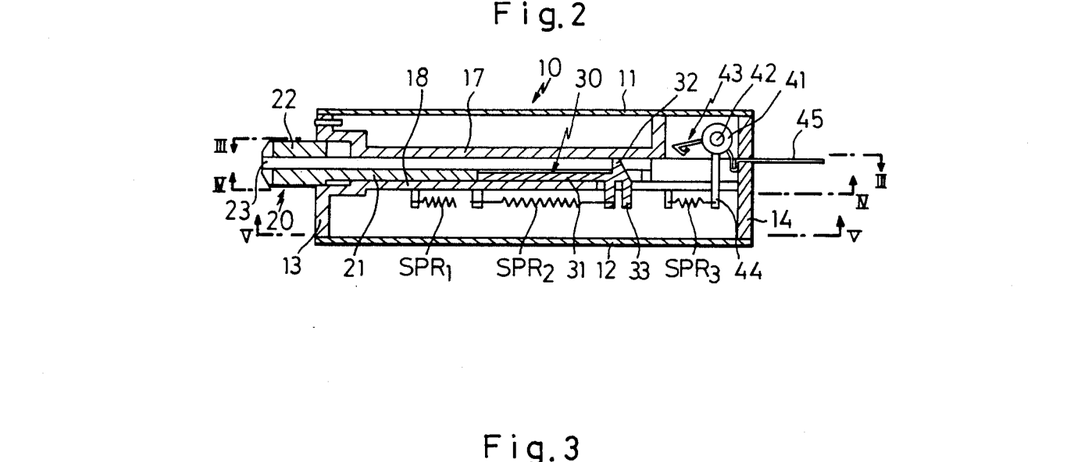
FIG. 2 is a longitudinal section of said device in which the IC card is not loaded.

The device has a casing 10 comprising a top wall 11, a bottom wall 12, an end wall 13, another end wall 14, a side wall 15 and another side wall 16. As best shown in FIG. 2, there are horizontally arranged a pair of boards 17, 18 in the casing 10 so as to form a path for the IC card supported by a slidingly movable member represented generally by 20.

The slidingly movable member 20 comprises a main board 21 and a portion 22 formed with a slit 23 for inletting the IC card K therethrough. The main board portion 21 is of a width only a little shorter than an inner width of the casing 10 or than a distance between the inner surfaces of the casing side walls 15, 16 and of a length a little shorter than that of the card K as best shown in FIGS. 3, 4, 8 and 9. The member 20 is mounted in the casing 10 in such a way that said card inlet portion 22 is protruded out of the casing end wall 13 and said main board portion 21 is supported by the second one 18 of said pair of boards in the casing to be slidingly movable relative thereto by a limited distance from the normal position shown in FIGS. 2-5 to the reading/writing position shown in FIGS. 8-11. The slidingly movable member 20 is normally held in said first position by spring means $SPR_1$.

Figure 3:
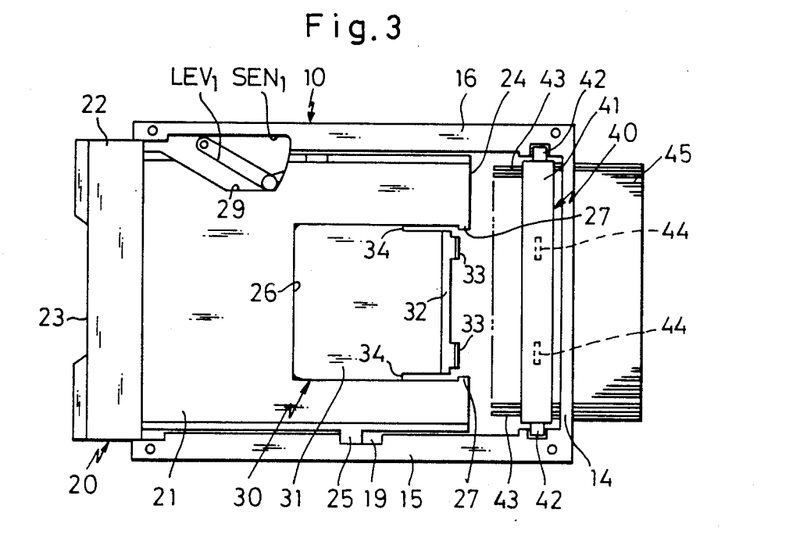
FIG. 3 is a plan view taken along a line III—III and viewed in a direction shown by arrows in FIG. 2.
Figure 4:
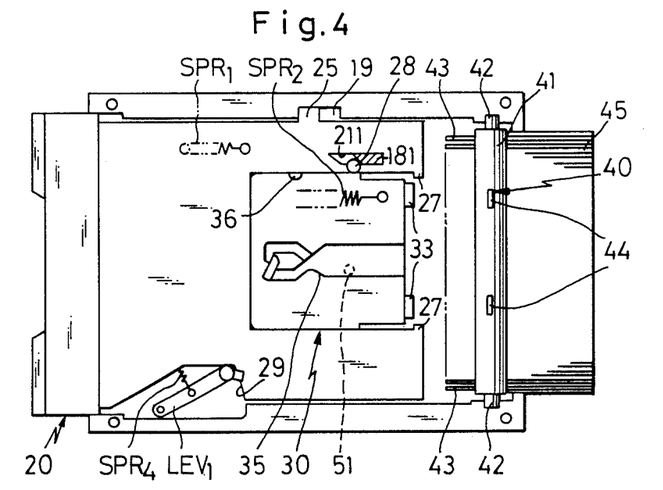
FIG. 4 is a reverse plan view taken along a line IV—IV and viewed in a direction shown by arrows in FIG. 2.

The relative movement of the sliding member 20 to the casing 10 may be limited by a transverse protrusion 25 of the movable board portion 21 and a recess 19 formed in the casing side wall 15 so as to embrace said protrusion to be movable therein by a distance to be defined by the longitudinal dimension thereof (FIGS. 3, 4). The main board portion 21 has a recess 26 at the forward end 24 so as to snugly embrace a carriage represented generally by 30 to be relatively movable in the longitudinal direction therein.

Figure 8:
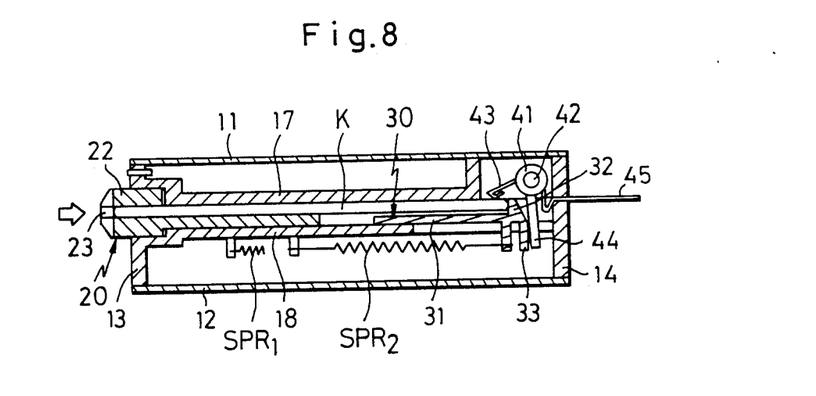
FIG. 8 is a sectional view similar to FIG. 2 but shown in the state where the IC card has been fully inserted to be in the position for reading/writing.
Figure 9:
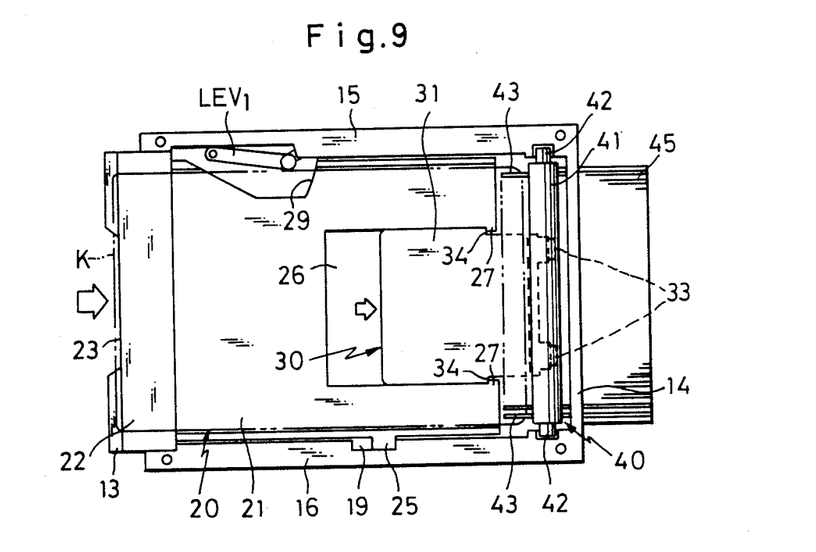
FIG. 9 is a plan view similar to FIG. 3 but shown in the state where movable members are in the position for reading/writing.
Figure 10:
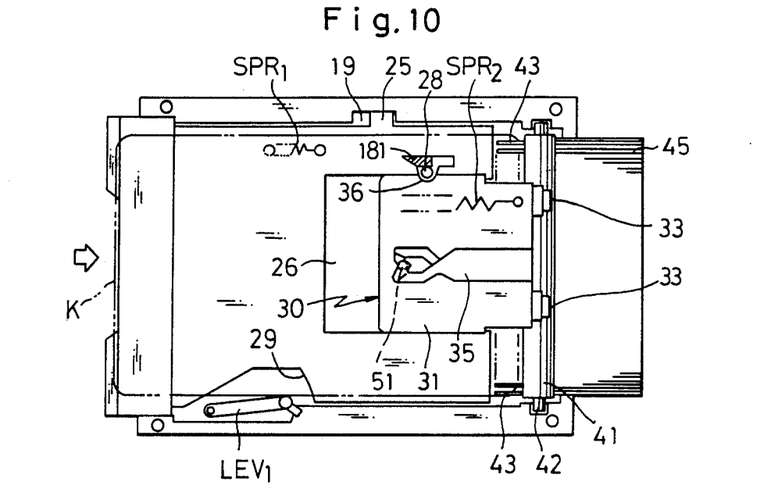
FIG. 10 is a reverse plan view similar to FIG. 4 but shown in said reading/writing position.

The carriage member 30 comprises a board 31 having an upwardly protruded flange 32 and downwardly protruded legs 33, 33 at the forward end thereof and is normally held in the position as shown in FIGS. 2, 3 and 4 by spring means $SPR_2$ relative to said slidingly movable member 20 and also to the casing 10, but when the IC card K is manually inserted from the slit 23, the forward end of the card K abuts on said flange 32 so as to move the carriage 30 against the force of said spring means $SPR_2$ towards the position as best shown in FIGS. 8, 9 and 10, during which the carriage 30 is moved firstly relative to the slidingly movable member 20 and then together with said member also against the force of the spring means $SPR_1$ due to engagement of a pair of inward protrusions 27, 27 formed at the forward end thereof with a pair of shoulders 34, 34 formed at the sides of the carriage board 31.

There is arranged conductive terminal means represented generally by 40 in the casing 10 just adjacent to the opposite end wall 14, said means having a transversely extended bar 41 of which journals 42, 42 are supported by the opposite side walls 15, 16 of the casing for angular movement. The transverse bar 41 has a plurality of conductive terminals 43 of the number and arrangement corresponding to those of the conductive terminals C of the IC card K as illustrated in FIG. 12 and downwardly protruded legs 44, 44 so that when the carriage 30 is urged to move from the normal position (FIG. 2) to the reading/writing position (FIG. 8) by the manually inserted IC card K to abut on the upwardly protruded flange 32 at the forward end, the downwardly protruded legs 33 may abut on said legs 44 so as to angularly move said bar 41 a little in the counterclockwise direction against the force of spring means $SPR_3$ holding the angularly movable bar 41 in the normal position as shown in said FIGS. 2 and 8, during which the comb-like terminals C (FIG. 12) of the IC card K manually forwardly moved are respectively contacted with the correspondingly arranged and downwardly urged comb-like terminals 43 to be wiped with each other for ensuring good electrical contacts therebetween. Said terminals 43 are connected repsectively with leads 45 preferably printed on a web so as to be electrically coupled with those of a data processing apparatus not shown.

Figure 13:
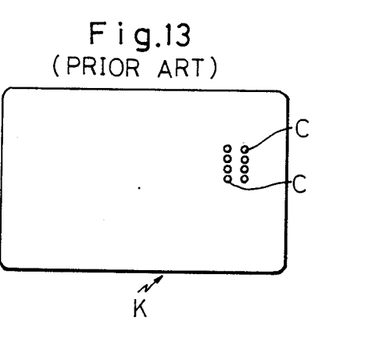

It goes without saying that when the IC card K having conductive terminals or contact points C as shown in FIG. 13 is to be used, the correspondingly arranged conductive terminals should be used.

Figure 5:
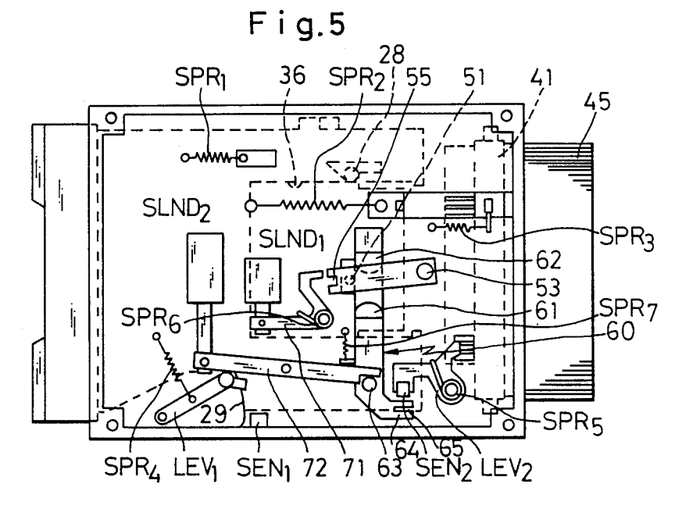
FIG. 5 is also a reverse plan view taken along a line V—V and viewed in a direction shown by arrows in FIG. 2.
Figure 11:
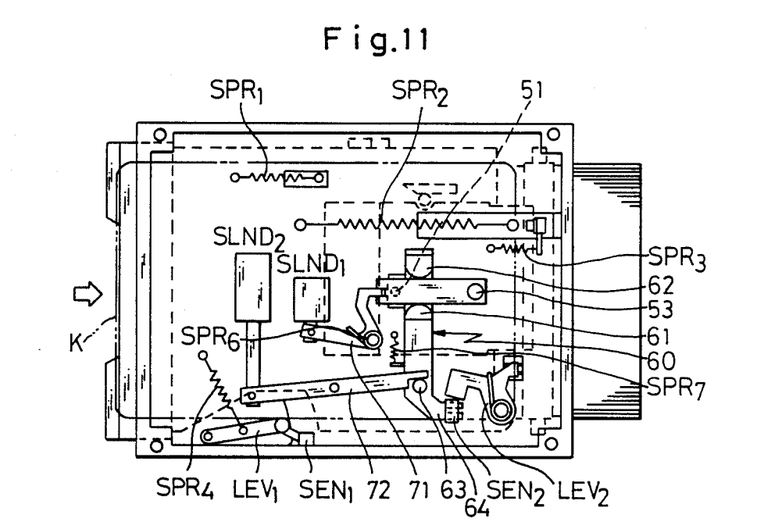
FIG. 11 is a reverse plan view corresponding to FIG. 5 but shown in the state where all movable members are brought to be in respective positions for reading/writing.
Figure 12:
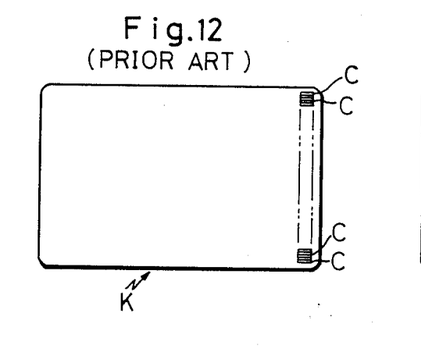
FIGS. 12 and 13 show two typical IC cards which are different with each other in arrangement and number of the conductive terminals to be electrically coupled with a data processing apparatus through the device of the invention.

There is formed a recess 29 in the slidingly movable board 21 in the vicinity of the card inlet slit 23 for allowing angular movement of a lever $LEV_1$ pivoted on the casing wall between the position shown in FIGS. 3-5 normally held there by spring means $SPR_4$ and the position shown in FIGS. 9-11 to which said lever $LEV_1$ is brought by the IC card K manually inserted into the path defined between the casing board 17 and the slidingly movable board 21 as well as the movable carriage board 31. On the side wall 16 there is mounted a sensor $SEN_1$ for detecting insertion of the IC card K when said lever $LEV_1$ is brought into said second position. In the vicinity of the conductive terminals 43, there is mounted another lever $LEV_2$ (acting as a light interceptor) on the casing board 18 so as to be normally held by spring means $SPR_5$ to be in the position where the lever stretches into the card path and angularly moved against the force of said spring by the card K when it is completely inserted to be in the reading/writing position. A Second sensor $SEN_2$ is mounted so as to detect said $LEV_2$ brought in said second position and consequently the card K having been brought in said reading/writing position, and also detect, by means of a transverse bar 60 (to be mentioned hereinafter), that the carriage 30 is locked in place.

As shown in FIG. 4, the slidingly movable board 21 is formed of a recess 211 on its surface facing the casing board 18. In the recess 21, a wedge-shaped member 181 protruded from the casing board 18 is engaged so as to slide along the recess 211 when the movable board 21 is moved. A ball member 28 is arranged in the recess 211 and abutted on the wedge-shaped member 181. The carriage board 31 is formed of a recess 36 so that when the latter is moved in the position shown in FIGS. 10, 11 where the IC card K is almost completely inserted into said path formed in the device, the ball 28 is urged by the wedge-shaped member 181 to engage with said recess 36 as best shown in FIG. 10 so that the both boards are joined to be movable together.

Figure 6:
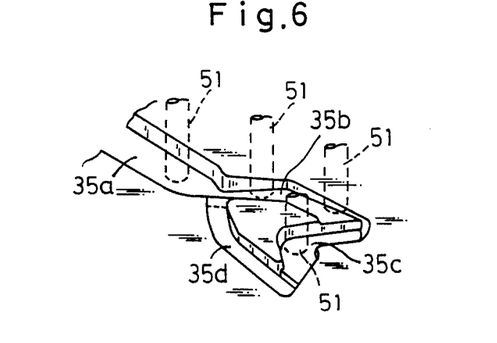
FIG. 6 is a perspective view of a cam groove formed in the lower surface of a carriage member.
Figure 7:
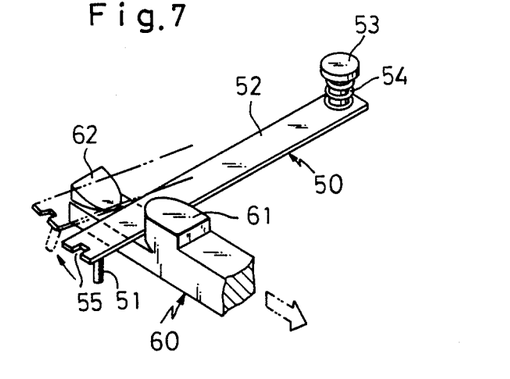
FIG. 7 is a perspective view of a cam lever having a pin to engage with said cam groove.

The carriage board 31 has a cam groove 35 formed in the reverse side thereof as shown in FIGS. 4, 10 and best shown in FIG. 6 in a larger scale to cooperate with a pin 51 planted on a cam lever means represented generally by 50 which is illustrated in FIG. 7 in a larger scale. The cam groove 35 comprises a longitudinally extended straight portion 35a where said pin 51 normally lies, a bifurcated first portion 35b, a hooked portion 35c where said pin 51 so engages with the groove as to hold the carriage 30 in position for reading/writing against the forces of spring means $SPR_1$ and $SPR_2$ and a bifurcated second portion 35d to merge again into said straight portion 35a, wherein concerned groove walls are so slanted as to smoothly guide the pin 51 to relatively move from the portion 35a through portions 35b, 35c and 35d to return to said initial portion 35a as the carriage 30 is moved from the normal position to the position for reading/writing and returned to the initial position.

The cam lever means 50 comprises a lever 52 at one end of which said pin 51 is planted thereon. The cam lever 52 is pivoted 53 at the other end thereof on the casing board 18 to angularly move between the positions shown in solid lines and phantom lines (FIG. 7). There is mounted on said board 18 a transversely extended bar represented generally by 60 (see also FIGS. 5 and 11) for longitudinal movement which has a stopper 61 on which said lever 52 normally abuts and a slanted face 62 on which said lever 52 may ride when it is brought in said position illustrated by phamtom lines. In order to allow the lever 52 to be in such slanted particular position, a coiled spring 54 is mounted around said pivot 53. The lever 52 has a notch 55 formed at the end in the vicinity of which said pin 51 is planted so that said notch 55 is to be engaged with a lock lever 71 at one end thereof.

The lock lever 71 is connected at the other end with a retractively movable rod of a solenoid $SLND_1$ pivoted at the center thereof and urged by spring means $SPR_6$ to be held at the normal position (FIG. 5) so that when said solenoid $SLND_1$ is energized to retract said rod therein said lever 71 is angularly moved against the force of said spring means $SPR_6$ so as to bring said lever 71 to said engagement with the notch 55 (FIG. 11).

There is mounted on the support board 18 another solenoid $SLND_2$ having a retractively movable rod with which a lever 72 is pivoted at one end thereof, while the other end thereof engages with a stopper pin 63 planted on said transversly extended and movable bar 60 so that normally the $LEV_1$ urged by spring means $SPR_4$ to stretch into the card path abuts on said lever 72 which holds said transverse bar 60 in the position shown in FIG. 5 (shown by phantom lines in FIG. 7) but when said $LEV_1$ is retracted by the inserted card K said transverse bar 60 may be brought in the position shown in FIG. 11 (shown by solid lines in FIG. 7) by spring means $SPR_7$ for the bar 60. The bar 60 has an arm 64 at one end thereof in which a slit 65 is formed. The slit 65 is brough above the sensor $SEN_2$ as shown in FIG. 11 when the card K is inserted in the device and the $LEV_1$ is pushed aside by the card K.

Now in operation, when the IC card K is manually inserted into the device from the inlet slit 23, the lever $LEV_1$ stretching into the card path is angularly moved thereby against the force of the spring $SPR_4$ so that the sensor $SEN_1$ detects the card K being in the device which may for instance ignite a pilot lamp (not shown) indicating the fact and bringing the data processing apparatus (not shown) to be ready for operation and that the lever 72 is disengaged from said lever $LEV_1$ to be freely movable and the transeverse bar 60 is brought to the position shown in FIG. 11 by the spring means $SPR_7$ and consequently the lever 52 is brought from the position shown by phantom lines to the position shown by solid lines in FIG. 7.

During the card K is further inserted, the leading end thereof abuts on the upwardly protruded flange 32 of the carriage to move the carriage 30 relative to the slidingly movable board 21 in the recess 26 against the force of the spring means $SPR_2$ towards the conductive terminals 43 and then the shoulders 34, 34 of the carriage 30 engage with the inward protrusions 27, 27 of the slidingly movable board 21 and concurrently the ball 28 engages with the recess 36 so as to join the carriage 30 and the slidingly movable board together, where the cam groove 35 guides the pin 51 from the normal portion 35a to the second portion 35b. The wedge-shaped member 181 retains the ball 28 in a position where the ball 28 firmly joins the carriage 30 with the slidingly movable board 21.

When the card K is further inserted, the carriage is moved together with the sliding board also against the force of the spring means $SPR_1$ so that the legs 33 of the carriage 30 abut on the downwardly projecting leg 44 to angularly move the conductive terminal bar 41. The comb-like conductive terminals 43 mounted therealong are thus urged on the moving card K to be frictionally contacted with the conductive terminals C for wiping with each other, during which the cam groove 35 guides the pin 51 from the second portion 35b to the hooked portion 35c.

When releasing the hand from the card K, the carriage board 31 and the slidingly movable board 21 are retreated by the force of the spring mean $SPR_1$ and $SPR_2$ only a little corresponding to a play space of said hooked groove portion 35c with which the pin 51 of the lever is firmly engaged, whereby accidental removal of the IC card K from the device during data processing can be prevented.

Before that the card K angularly moves the lever $LEV_2$ against the force of the spring means $SPR_5$, the slit 65 of the arm 64 is brought above the sensor $SEN_2$. Then the light interceptor lever $LEV_2$ is angularly moved so as to be apart from the sensor $SEN_2$ while the slit 65 is kept in the position above the sensor $SEN_2$ so that the latter generates a signal which is brought to the not shown data processing device to bring it to the state for operation. Consequently, the solenoid $SLND_1$ is correspondingly energized by the data processing device to retract the concerned rod so as to engage the free end of the lever 71 with the notch 55 of the lever 52, whereby even if the slidingly movable member 20 is accidentally pushed the cam lever 52 can not be angularly moved so as to prevent the card K from being removed.

When reading/writing operation by the data processing apparatus is over, the solenoid $SLND_1$ is deenergized so as to disengage the lever 71 by the force of the spring means $SPR_6$ from the notch 55 and make the cam lever 52 to be free for movement.

When the card K is manually removed, the lever $LEV_1$ is returned to the normal position owing to the spring means $SPR_4$ which is detected by the sensor $SEN_1$ so as to deenergized the pilot lamp etc. not shown.

The solenoid $SLDN_2$ is energized in reply to a particular signal or automatically as a result of the end of data processing so that the concerned rod is retracted to angularly move the free end of the lever 72 which abuts on the stopper pin 63 of the transeverse bar 60 to be longitudinally moved against the force of the spring means $SPR_7$. Thereby the cam lever 52 rides on the slanted face 62 so as to slantedly rise up from the surface of the board 18 so that the pin 51 disengages from the cam groove portion 35c and consequently the released carriage board 31 is brought to the initial position together with the slidingly movable board 21, which is jointed with said carriage by means of engagement of the ball 28 with the recess 34, owing to the force of the spring means $SPR_1$, $SPR_2$.

When the slidingly movable board 21 is brought to a position where the transverse protrusion 25 of said board reaches just before abutment on the concerned face of the recess 19 formed in the casing wall, the engagement of the ball 28 with the recess 34 by the wedge-shaped member 181 is disengaged so that the carriage board 31 is moved by the force of the spring means $SPR_2$ relative to the slidingly movable board 21 to be in the initial position in the recess 26 formed in the board 21, whereby the card K supported by the upper surface of the slidingly movable board 21 and the carriage board 31 is exposed a little out of the slit 23 owing the relevant selection of dimensions of the concerned portions so as to allow removal of the card K.

In case where the card K is not automatically as referred to above but manually brought to the position allowing free removal of the card, the slidingly movable member 20 is manually moved a little by pushing directly the portion 22 or indirectly the card K in the state where the reading/writing operation is over, namely when the free end of the lock lever 71 is disengaged from the notch 55 so as to release the cam lever 52 for free movement, whereby the carriage 30 is also pushed a little directly according to abutment of the card K on the upwardly protruded flange 32 or indirectly according to the ball 28 with the recess 34 engagement, during which the pin 51 of the cam lever 52 is guided to enter the second bifurcated cam portion 35d, whereby the engagement of the pin 51 with the cam groove portion 35c and consequently the engagement of the carriage with the casing is freed.

When removing the hand from the card K or the slidingly movable member 20 at the portion 22, the carriage member 20 is brought to the initial position by the force of the spring means $SPR_1$, $SPR_2$ during which the pin 51 steps in the second bifurcated cam portion 35d and then in the initial cam portion 35a, where the card K is exposed a little out of the slit 23.

When it should be necessary to remove the card K out of the device despite of that the data processing is not yet over, the card K may be removed for instance by means of a pincette and the like so that the lever $LEV_1$ is correspondingly brought in the normal position owing to the force of the spring means $SPR_4$ to abut on the lever 72 at the free end. Thus, the transverse bar 60 is longitudinally moved to be in the normal position shown in FIG. 5 and consequently the cam lever 52 is angularly moved to the position shown by phantom lines in FIG. 7 to ride on the slanted surface 62 of the transverse bar 60 and to be slantedly float from the surface of the board 18. Thus, the engagement of the pin 51 with the groove portion 35c and consequently the engagement of the carriage 30 with the casing 10 is relesed as referred to above so that the carriage 30 and the slidingly movable member 20 may be returned together to the initial position owing to the spring means $SPR_1$ and $SPR_2$.

What is claimed is:

1. Device for reading/writing an IC card as external memory comprising:
   first and second spring means, each of said first and second spring means being mounted in a casing;
   a slidingly movable board provided with a portion formed with a slit for manually inserting the card therethrough, said slidingly movable board being mounted in the casing so that the slit portion is protruded out of one end of the casing by the force of said first spring means;
   a carriage member cooperated with said slidingly movable board so as to be slidingly movable with respect thereto by the IC card inserted through the slit, said carriage member being forced by said second spring means towards the slit;
   means for combining the slidingly movable board with the carriage member at a position where the carriage member is advanced by a predetermined distance with respect to the slidingly movable board against the force of said second spring means;
   means for holding the carriage member at a reading/writing position against the force of said first and second spring means, and for releasing the carriage member from the holding after the reading/writing operation is performed and the carriage member is slightly pushed forward against the force of said second spring means; and
   conductive terminal means for contacting terminals of the IC card when the carriage member is advanced to the reading/writing position.

2. Device as set forth in claim 1, wherein said conductive terminals means are mounted on an angularly movable member so that when said carriage member is going to reach said reading/writing position, said member may be angularly moved by abutment with the carriage member so as to cause frictional contact of the conductive terminal means mounted thereon with the terminals of the card carried by the carriage member still moving further toward said reading/writing position for wiping with each other.

3. Device as set forth in claim 1, wherein the combining means has a recess formed on the slidingly movable board in which a wedge-shaped member formed on the casing is engaged so as to be able to longitudinally slide along the recess when the slidingly movable board is longitudinally moved relative to the casing, a ball member arranged in the recess so as to be partly pushed out from the recess by means of the wedge-shaped member, and a recess formed on the carriage member which engages with the ball member when the carriage member is advanced by a predetermined distance with respect to the slidingly movable board so as to combine the carriage member with the slidingly movable board through the ball member partly pushed out by the wedge-shaped member.

4. Device as set forth in claim 1, wherein the holding means comprises a cam groove having a hooked portion formed in the carriage member, a cam lever having a pin planted at one end thereof and pivoted on the casing wall so that when said carriage member is moved forward said pin is guided by said cam groove to relatively move therealong and when said carriage member reaches said reading/writing position and is released to move backward by the force of said second spring means, said pin may engage with said hooked portion of the cam groove so as to hold said carriage member in position against the force of the first and second spring means, and first solenoid means energized when said carriage member is brought in said reading/writing position so as to lock said cam lever in the position even if the carriage member is moved forward.

5. Device as set forth in claim 4, wherein said cam lever is angularly movable from a first position where said lever rides on a slanted surface and a second position where the pin is vertically engaged with said cam groove, and further comprising second solenoid means which is energized to bring said cam lever to said first position so as to disengage said pin out of the hooked portion of the cam groove.

6. Device as set forth in claim 5, further comprising a lever for operationally interconnecting the second solenoid means with the cam lever through a transverse bar, and a second lever forced by spring means so as to actuate said first lever in a direction for bringing said cam lever to said first position when the card is removed from the casing.

7. Device as set forth in claim 1, further comprising a sensor to detect that the IC card is loaded.

8. Device as set forth in claim 1, further comprising a sensor to detect that the IC card is in the position for reading/writing.

* * * * *